(12) United States Patent
Sheini et al.

(10) Patent No.: US 12,056,090 B1
(45) Date of Patent: Aug. 6, 2024

(54) AUTOMATED PREPROCESSING OF COMPLEX LOGS

(71) Applicant: MICRO FOCUS LLC, Santa Clara, CA (US)

(72) Inventors: Pezhman Jasper Sheini, Sterling, VA (US); Manish Marwah, Pleasanton, CA (US); Martin Fraser Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 18/315,335

(22) Filed: May 10, 2023

(51) Int. Cl.
*G06F 16/10* (2019.01)
*G06F 16/13* (2019.01)
*G06F 16/16* (2019.01)
*G06F 16/17* (2019.01)

(52) U.S. Cl.
CPC .......... *G06F 16/1734* (2019.01); *G06F 16/13* (2019.01); *G06F 16/16* (2019.01)

(58) Field of Classification Search
None
See application file for complete search history.

(56) References Cited

U.S. PATENT DOCUMENTS

| | | | |
|---|---|---|---|
| 7,454,790 B2 | 11/2008 | Potok | |
| 10,423,624 B2 | 9/2019 | Simhon | |
| 10,567,409 B2 | 2/2020 | Zhang | |
| 2020/0042422 A1 | 2/2020 | Togawa | |
| 2022/0318208 A1* | 10/2022 | Tripathi | ................ G06F 16/192 |
| 2022/0365957 A1 | 11/2022 | Han | |
| 2023/0262074 A1* | 8/2023 | Guo | ...................... H04L 63/083 |
| | | | 726/22 |

FOREIGN PATENT DOCUMENTS

| | | |
|---|---|---|
| CN | 114490235 A | 5/2022 |
| CN | 114647558 A | 6/2022 |
| CN | 115509848 A | 12/2022 |
| CN | 111435343 B | 2/2023 |
| EP | 3660719 A1 | 6/2020 |

* cited by examiner

*Primary Examiner* — Jau Shya Meng
(74) *Attorney, Agent, or Firm* — Sheridan Ross P.C.

(57) ABSTRACT

Embodiments of the disclosure provide systems and methods for analyzing log files. Automated processing of log files can comprise reading a log file generated during execution of an application and comprising a plurality of log events and generating a plurality of templates based on the plurality of log events in the log file. Each template can map a log event to a candidate value for the log event. The plurality of log events can be aggregated into a plurality of groups based on the candidate value mapped to each log event in the plurality of templates and the plurality of groups of log events can be ranked. The log file can be partitioned based on the ranking of the plurality of groups of log events and one or more groups of log events can be provided to an analysis process based on the partitioning of the log file.

20 Claims, 6 Drawing Sheets

AUTOMATED PREPROCESSING OF COMPLEX LOGS

FIELD OF THE DISCLOSURE

Embodiments of the present disclosure relate generally to methods and systems for analyzing log files generated during the execution of an application and more particularly to preprocessing of the log files into partitions for analysis.

BACKGROUND

Software producers build increasingly sophisticated and complex software products. These products typically involve many different components that need to work together to provide the expected functionality. On occasion, one or more components do not function as expected. Troubleshooting often involves analyzing a log file that contains a variety of information that has been recorded over time from the various components. Depending on the level of detail that each component reports, the number of components, number of threads running, etc., the log files can be massive and extremely complex. Accordingly, analyzing such logs, even using automated analytics, can take a significant amount of time which can prolong the downtime of the system. Furthermore, analysis of the raw log files can be error prone which can also prolong downtime and increase the repair cost. Hence, there is a need for improved methods and systems for pre-processing of such logs to facility further analysis processes performed on the log files.

BRIEF SUMMARY

Embodiments of the disclosure provide systems and methods for analyzing log files. According to one embodiment, a method for automated processing of log files can comprise reading a log file generated during execution of an application and comprising a plurality of log events and generating a plurality of templates based on the plurality of log events in the log file. Each template of the plurality of templates can map a log event of the plurality of log events in the log file to a candidate value for the log event.

The plurality of log events can be aggregated into a plurality of groups based on the candidate value mapped to each log event in a plurality of templates and the plurality of groups of log events can be ranked. Aggregating the plurality of log events into the plurality of groups can comprise identifying a length of each candidate value mapped to each log event in a plurality of templates, determining whether different lengths of candidate values have been identified, and in response to determining different lengths of candidate values have been identified, separating the log events into a plurality of lists based on the identified length of the candidate value mapped to the log event. Aggregating the plurality of groups of candidate identifiers can further comprise identifying, for each list of the plurality of lists, a common substring for the candidate values in each list and aggregating one or more lists of the plurality of lists based on the identified common substring for each list. Ranking the plurality of groups of candidate identifiers can comprise computing one or more features for each list in the plurality of lists and calculating a ranking score for each list in the plurality of lists based on the computed one or more features for each list. For example, the one or more features can comprise one or more of a number of log events in each list, a number of templates of the plurality of templates that include the candidate values mapped to the log events in each list, a log file coverage for the log events in each list, or an average list size for the plurality of lists.

The log file can be partitioned based on the ranking of the plurality of groups of log events and one or more groups of log events of the plurality of groups of log events can be provided to an analysis process based on the partitioning of the log file. Partitioning the log file can comprise identifying a chain of related log events for each of the provided one or more groups of log events. Providing the one or more groups of log events of the plurality of groups of log events to an analysis process can comprise providing the identified chain of related log events for each of the provided one or more groups of log events.

According to another embodiment, a system can comprise a processor and a memory coupled with and readable by the processor. The memory can store therein a set of instructions which, when executed by the processor, causes the processor to read a log file generated during execution of an application and comprising a plurality of log events and generate a plurality of templates based on the plurality of log events in the log file. Each template of the plurality of templates can map a log event of the plurality of log events in the log file to a candidate value for the log event.

The instructions can further cause the processor to aggregate the plurality of log events into a plurality of groups based on the candidate value mapped to each log event in a plurality of templates and rank the plurality of groups of log events. Aggregating the plurality of log events into the plurality of groups can comprise identifying a length of each candidate value mapped to each log event in a plurality of templates, determining whether different lengths of candidate values have been identified, and in response to determining different lengths of candidate values have been identified, separating the log events into a plurality of lists based on the identified length of the candidate value mapped to the log event. Aggregating the plurality of groups of candidate identifiers can further comprise identifying, for each list of the plurality of lists, a common substring for the candidate values in each list and aggregating one or more lists of the plurality of lists based on the identified common substring for each list. Ranking the plurality of groups of candidate identifiers can comprise computing one or more features for each list in the plurality of lists and calculating a ranking score for each list in the plurality of lists based on the computed one or more features for each list. For example, the one or more features can comprise one or more of a number of log events in each list, a number of templates of the plurality of templates that include the candidate values mapped to the log events in each list, a log file coverage for the log events in each list, or an average list size for the plurality of lists.

The instructions can further cause the processor to partition the log file based on the ranking of the plurality of groups of log events and provide one or more groups of log events of the plurality of groups of log events to an analysis process based on the partitioning of the log file. Partitioning the log file can comprise identifying a chain of related log events for each of the provided one or more groups of log events. Providing the one or more groups of log events of the plurality of groups of log events to an analysis process can comprise providing the identified chain of related log events for each of the provided one or more groups of log events.

According to yet another embodiment, a non-transitory, computer-readable medium can comprise a set of instructions stored therein which, when executed by a processor, causes the processor to read a log file generated during execution of an application and comprising a plurality of log events and generate a plurality of templates based on the plurality of log events in the log file. Each template of the plurality of templates can map a log event of the plurality of log events in the log file to a candidate value for the log event.

The instructions can further cause the processor to aggregate the plurality of log events into a plurality of groups based on the candidate value mapped to each log event in a plurality of templates and rank the plurality of groups of log events. Aggregating the plurality of log events into the plurality of groups can comprise identifying a length of each candidate value mapped to each log event in a plurality of templates, determining whether different lengths of candidate values have been identified, and in response to determining different lengths of candidate values have been identified, separating the log events into a plurality of lists based on the identified length of the candidate value mapped to the log event. Aggregating the plurality of groups of candidate identifiers can further comprise identifying, for each list of the plurality of lists, a common substring for the candidate values in each list and aggregating one or more lists of the plurality of lists based on the identified common substring for each list. Ranking the plurality of groups of candidate identifiers can comprise computing one or more features for each list in the plurality of lists and calculating a ranking score for each list in the plurality of lists based on the computed one or more features for each list. For example, the one or more features can comprise one or more of a number of log events in each list, a number of templates of the plurality of templates that include the candidate values mapped to the log events in each list, a log file coverage for the log events in each list, or an average list size for the plurality of lists.

The instructions can further cause the processor to partition the log file based on the ranking of the plurality of groups of log events and provide one or more groups of log events of the plurality of groups of log events to an analysis process based on the partitioning of the log file. Partitioning the log file can comprise identifying a chain of related log events for each of the provided one or more groups of log events. Providing the one or more groups of log events of the plurality of groups of log events to an analysis process can comprise providing the identified chain of related log events for each of the provided one or more groups of log events.

Figure 1:
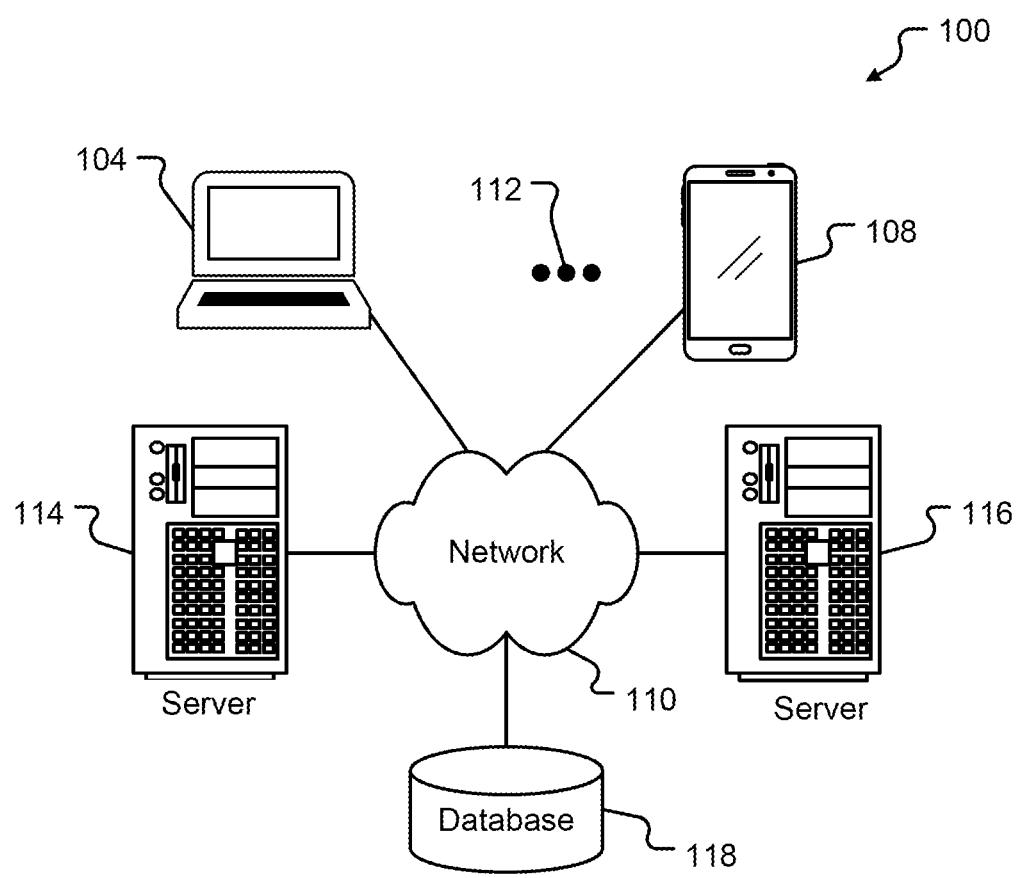
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 can comprise a web server and server 116 can comprise an application server. The server 114, which may be used to process requests for web pages or other electronic documents from computing devices 104, 108, 112. The server 114 can be running an operating system including any of those discussed above, as well as any commercially-available server operating systems. The server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C #®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
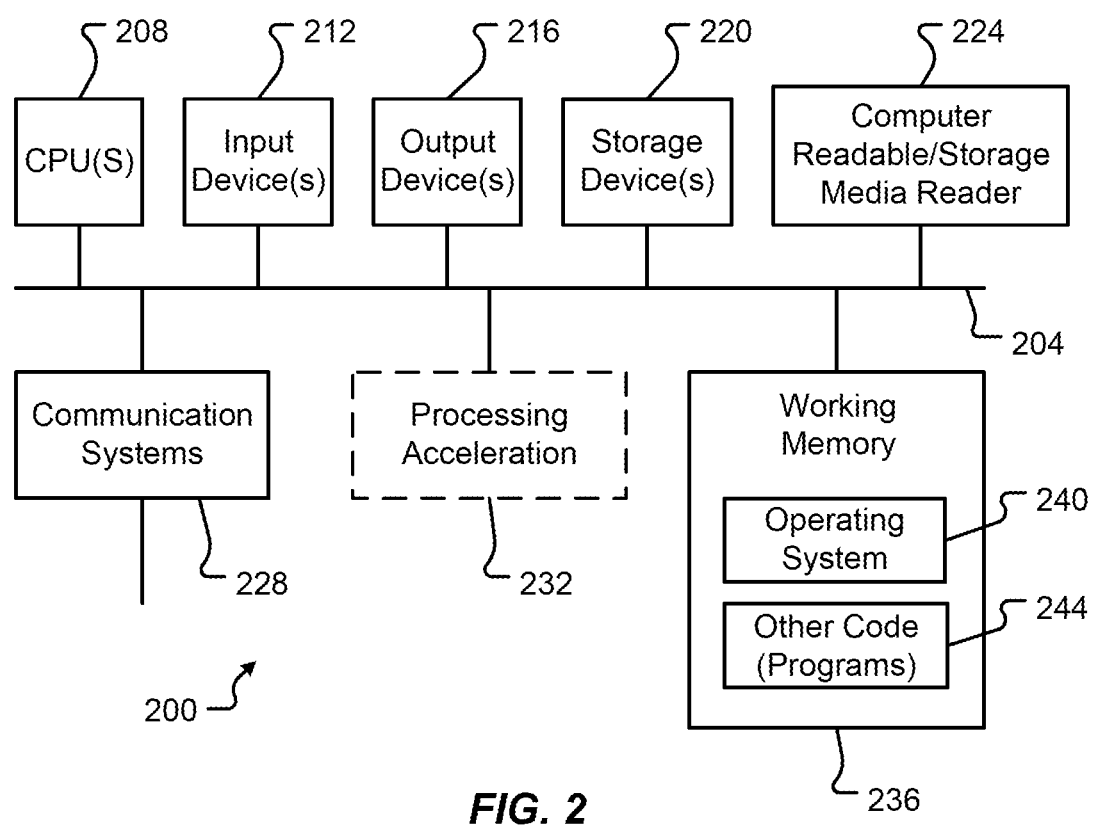
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
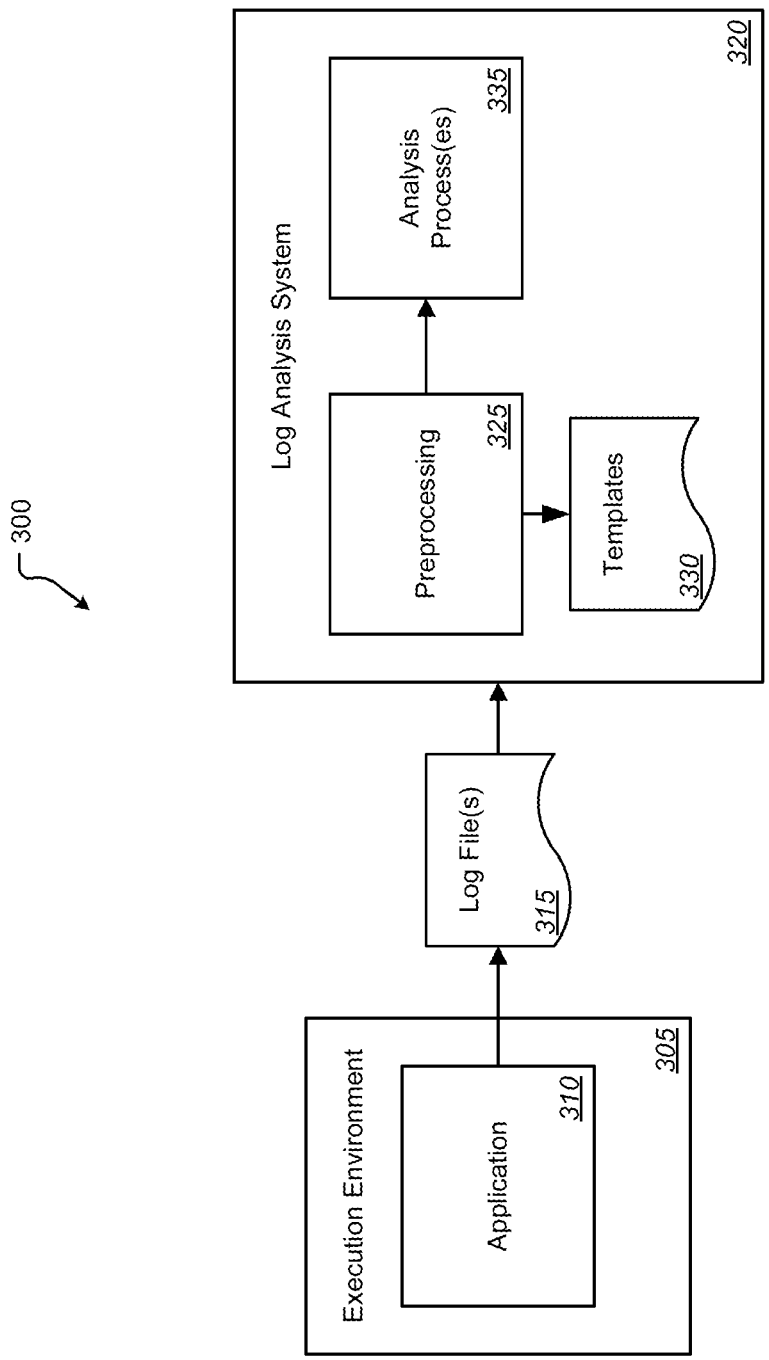
FIG. 3 is a block diagram illustrating an exemplary environment in which log files can be generated, pre-processed, and analyzed according to one embodiment of the present disclosure.

FIG. 3 is a block diagram illustrating an exemplary environment in which log files can be generated, preprocessed, and analyzed according to one embodiment of the present disclosure. As illustrated in this example, the environment 300 can comprise an execution environment 305 of system. The execution environment 305 can comprise any number of servers and/or other computing devices as described above. The execution environment 305 can execute one or more applications 310 as known in the art. Also as known in the art, the execution environment 305 can generate one or more log files 315, such as a vertical log file from a Vertica database or a collection of aggregated events from a Syslog server, for example, based on execution of the application 310. Such logs can comprise lists of log event occurring during execution of the application 310 and can include, but are not limited to, application logs, Operating Systems (OS) level logs, logs generated by devices, etc., and combinations of logs from different sources.

The environment 305 can also include a log analysis system 320. The log analysis system 320 can comprise any number of servers and/or other computing devices as described above and can be coupled with the execution environment 305 via a communications network (not shown here) via any one or more wired and/or wireless, local, and/or wide area networks as described above including, but not limited to the Internet. The log analysis system 320 can comprise a preprocessing module 325 and can execute one or more analysis processes 335. Log analysis can be performed in real-time, or near real-time, as the logs are generated, or on demand as requested by an analyst, or periodically in a batched fashion.

Generally speaking, the preprocessing module 325 can parse the log file 315 and group the log events therein so that related events can be organized and clustered. These groups can then be ranked and provided to the analysis processes 335 for further analysis, e.g., root cause analysis, anomaly detection and prediction, etc. More specifically, the preprocessing module 325 performs discovery of identifiers (IDs) for log events and clusters relevant log events based on the discovered IDs. This clustering and subsequent partitioning of the log files 315 can be performed by the preprocessing module 325 in real-time or near real-time. Because of the size and complexity if typical log files 315, such clustering is not only error prone but simply cannot be performed in anything approaching real time by human experts. Additionally, separate analyses can be run on each log cluster and insights can be achieved from different parts of the logged system when submitted to the analysis processes 335. The analysis processes 335 can comprise human analysis facilitated by the pre-processed log file 315, an automated, machine process, or some combination thereof. In addition to performing any one or more analysis on the partitioned log files provided by the preprocessing module 325, the analysis processes 335, or other processes (not shown here) triggered by the analysis processes 325 can take corrective actions based on the partitioned log files 315. These corrective actions can include, but are not limited to, quarantining or otherwise limit resource access by the application 310 or certain components of the application 310 identified based on the partitioned log files 315, blocking a port on a firewall, reconfiguring the software application 310, starting a malware scan of the application 310, etc.

The preprocessing module 325 can implement a multi-stage approach to automate the complex log preprocessing. As a first stage, the preprocessing module 325 can generate a set of templates 330. The templates 330 can store mappings of template number, positional number, etc. to a list of candidate values for log events and a list of log indices for the log file 315. For example, the application source code can be used to generate templates 330 and extract candidate groups of log events with their corresponding log index, template number, and positional number.

Next, as a second stage, potential candidate values for log events can be grouped together, i.e., similar candidate values can be aggregated. To do so, the preprocessing module 325 can iterate through the stored mappings of the templates 330. If the list of candidate log event values includes values with different lengths, they can be separated into lists with the same length. For each list, the template number, positional number, list of values, list of corresponding log indexes, list of values that digits are masked, and the common substring (or longest common sequence) of digits masked values can be stored. The list generated in the previous step can then be aggregated based on a common substring and value length.

Features of the log events and a ranking score for the groups of log events can be calculated by the preprocessing module 325 in a third stage. For example, the preprocessing module 325 can compute features such as number of unique templates, number of partitions, log coverage, template coverage, etc. for each group of log events. Chains of related events can be identified and assigned a chain identifier. The ranking score can then be calculated based on the features for each group of log events as will be described in greater detail below.

For the fourth stage, the preprocessing module 325 can select log partitions to provide to the analysis processes 335 based on the ranking score for each group of log events. For example, certain number of top ranked candidates can be selected to be presented to experts or processes. The experts can pick or confirm relevant identifiers/chains of identifiers. The "approved" identifiers can then be used to extract their corresponding log events and build the partitions. These partitions can be used to extract features and build on any downstream applications.

Figure 4:
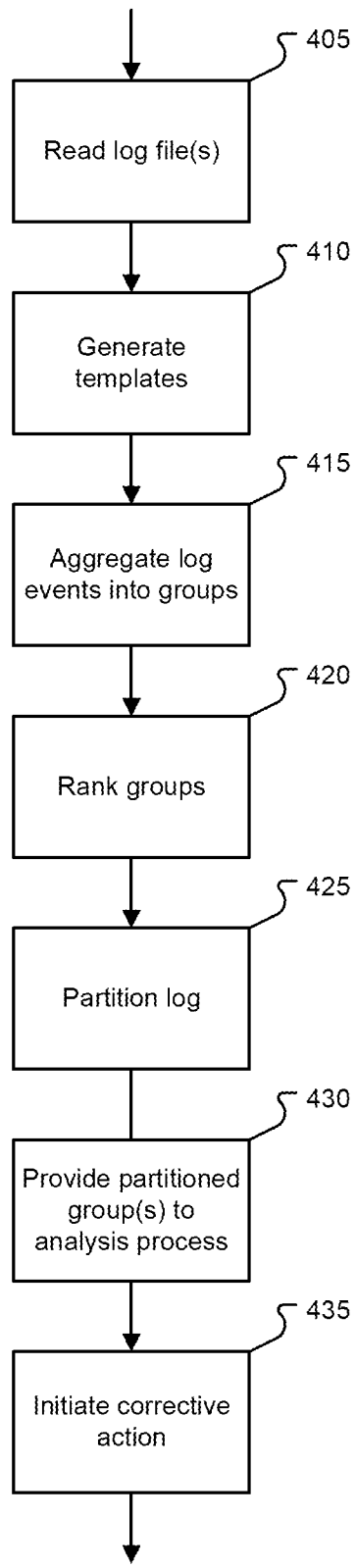
FIG. 4 is a flowchart illustrating an exemplary process for automated processing of log files according to one embodiment of the present disclosure.

FIG. 4 is a flowchart illustrating an exemplary process for automated processing of log files according to one embodiment of the present disclosure. As illustrated in this example, automated, real-time processing of log files can comprise reading 405 a log file generated during execution of an application. The log file can comprise a plurality of log events.

A plurality of templates can be generated 410 based on the plurality of log events in the log file. Each template of the plurality of templates can map a log event of the plurality of log events in the log file to a candidate value for the log event. For example, generating 410 the templates and retrieving the candidate values can be performed according to the approach described in "Detecting Large-Scale System Problems by Mining Console Logs" by Xu, W., Huang, L., Fox, A., Patterson, D., & Jordan, M. I. in *Proceedings of the ACM SIGOPS 22nd Symposium on Operating Systems Principles* 2009 (pp. 117-132) if the source code is available for the application(s) generating the log files. This approach can retrieve even the least common log templates accurately and omit most of the heuristics of existing log parsing solutions. Alternatively, other methods can be used to generate 410 the templates based on domain knowledge of the log file.

The plurality of log events can be aggregated 415 into a plurality of groups based on the candidate value mapped to each log event in a plurality of templates and the plurality of groups of log events can be ranked 420. Additional details of an exemplary process for aggregating 415 the log events into groups will be described below with reference to FIG. 5. Additional details of an exemplary process for ranking 420 the groups of log events will be described below with reference to FIG. 6.

The log file can be partitioned 425 based on the ranking of the plurality of groups of log events and one or more groups of log events of the plurality of groups of log events can be provided 430 to an analysis process based on the partitioning of the log file. Partitioning 425 the log file can comprise identifying a chain of related log events for each of the provided one or more groups of log events. Providing 430 the one or more groups of log events of the plurality of groups of log events to an analysis process can comprise providing the identified chain of related log events for each of the provided one or more groups of log events.

For example, providing 430 the one or more groups of log events of the plurality of groups of log events to an analysis process can comprise presenting a number of the top candidates' IDs with previously computed features and a few sample log events to a human expert or trained expert process, which will pick the identifiers/chains of identifiers. Afterward, relevant (cluster) logs can be separated by selected identifiers with minimum or no coverage overlaps. This is especially helpful in the case of complex logs where different parts of the logged system have distinct behavior. After clustering log events, each cluster with a corresponding identifier or a chain of identifiers can be partitioned. Then, for each log cluster, features can be extracted for each partition, and any downstream log analysis, including log anomaly detection and prediction, can use this output.

According to one embodiment, the process can further comprise initiating 435 corrective actions based on the partitioned log files 315. These corrective actions can include, but are not limited to, quarantining or otherwise limit resource access by the application 310 or certain components of the application 310 identified based on the partitioned log files 315, blocking a port on a firewall, reconfiguring the software application 310, starting a malware scan of the application 310, etc.

Figure 5:
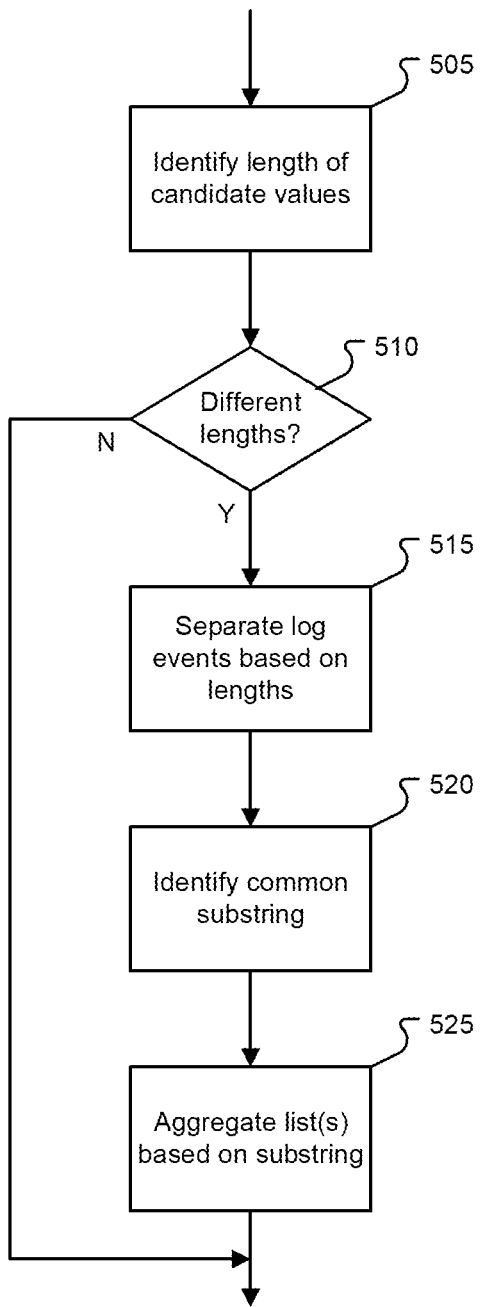
FIG. 5 is a flowchart illustrating additional details of an exemplary process for aggregating log events according to one embodiment of the present disclosure.

FIG. 5 is a flowchart illustrating additional details of an exemplary process for aggregating log events according to one embodiment of the present disclosure. As illustrated in this example, aggregating the plurality of log events into the plurality of groups can comprise identifying 505 a length of each candidate value mapped to each log event in a plurality of templates. A determination 510 can then be made as to whether different lengths of candidate values have been identified. In response to determining 510 different lengths of candidate values have been identified, the log events can be separated 515 into a plurality of lists based on the identified length of the candidate value mapped to the log event.

Similar candidate values can be aggregated using the mappings we achieved by parsing the logs in the first stage. This list of candidate values encompasses similar values in most cases because they are retrieved from the same template and generated by the same variable. However, the similarity can be improved by separating values of different lengths into separate lists. This can be performed by keeping all the corresponding metadata with each list before dividing them into lists with distinct value lengths. This metadata includes the template number, positional number, and corresponding log indices.

Aggregating the plurality of groups of candidate identifiers can further comprise identifying 520, for each list of the plurality of lists, a common substring for the candidate values in each list and aggregating 525 one or more lists of the plurality of lists based on the identified 520 common substring for each list. In other words, the common substring (or longest common substring) of digit-masked values of each list can be tracked and the two lists and their corresponding metadata can be aggregated if the common substring of one list could be the common substring of the other and their values have the same length. The result is a list of distinct candidate IDs (CIDs) with all the related metadata.

Figure 6:
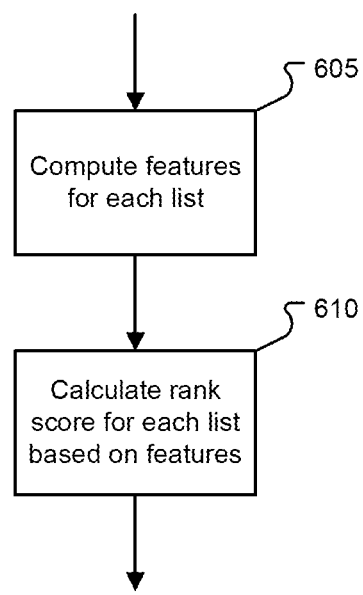
FIG. 6 is a flowchart illustrating additional details of an exemplary process for ranking groups of log events according to one embodiment of the present disclosure.

FIG. 6 is a flowchart illustrating additional details of an exemplary process for ranking groups of log events according to one embodiment of the present disclosure. As illustrated in this example, ranking the plurality of groups of candidate identifiers can comprise computing 605 one or more features for each list in the plurality of lists and calculating 610 a ranking score for each list in the plurality of lists based on the computed one or more features for each list. For example, the one or more features can comprise one or more of a number of log events in each list, a number of templates of the plurality of templates that include the candidate values mapped to the log events in each list, a log file coverage for the log events in each list, or an average list size for the plurality of lists.

Stated another way, a ranking score can be calculated 610 based on features including, but not limited to, log coverage, the number of log events matching a CID divided by the number of all log events in the file, template coverage, i.e., the number of unique log templates that contain CID values divided by the number of all log templates, number of partitions, i.e., the number of unique values corresponding to a CID, and/or average partition size, i.e., all values extracted from the log file that corresponds to a CID, divided by the number of partitions.

A combination of two or more identifiers can be used in a pair or chain for partitioning. For example, this can be done when the first identifier acts more like a keyword and can be used to extract logs involved with some specific task. In other words, the first identifier can be used to separate relevant logs, but they may be in just one or very few partitions. Therefore, a second identifier can be used to partition the "partially" separated logs. The second identifier can be a value that changes more frequently, such as transaction ID in the case of database logs. So, by using both identifiers, logs can be separated and partitioned at the same time.

Embodiments of the present disclosure can also automatically generate potential chains of identifiers by picking the first identifier in the lower quartile and the second identifier from the upper quartile of the number of partitions. Next, the log coverage overlap can be computed for each pair. If the pair have a coverage overlap, they can be picked as potential candidates, and the number of partitions, log coverage, and template coverage can be recomputed. Finally, the ranking score can be calculated 610, and potential candidates can be sorted based on the score.

The ranking score can built upon properties including, but not limited to, the number of partitions (which positively correlates to ranking score up to a threshold and then correlates negatively), the template coverage (which positively correlates to ranking score up to a threshold and then correlates negatively), the log coverage (which positively correlates to ranking score), the average partition size (which has a negative correlation with the number of partitions), and/or others. These properties can be scaled using min-max normalization An example of the score formula for the number of partitions (np) and template coverage (tc) is shown below as F0, where k is a threshold. For log coverage (lc), formula F1 below can be used, and for the average partition size (aps) the F2 formula below can be used to compute the score. Since the first two features exhibit two distinct behaviors, they use F0, which also switches behavior based on threshold K The F1 formula is picked for scoring log coverage size, where the score increases with increasing log coverage. The F2 formula is selected for the average partition size because when the average partition size increases drastically, the chance of a candidate being an identifier also drastically decreases.

$$F_0 = \left\{0 < x_1 < k : e^{-\frac{(x_1-k)^2}{k}}, k \le x_1 < 1 : e^{-\frac{(x_1-k)^2}{0.01}}\right.$$

$$F_1 = \left\{0 < x < 1, 0 < k < 1 : kx^2\right\}$$

$$F_2 = \left\{0 < x < 1, 0 < k < 1 : -kx^2 + 1\right\}$$

Additionally, K can be adjusted (between 0 and 1) separately for each feature depending upon the dataset (for example, k=0.6). Finally, the individual feature scores can be aggregated and the ranking score can be calculated based on each feature score using the formula:

$$\frac{4}{\frac{1}{np} + \frac{1}{lc} + \frac{1}{tc} + \frac{1}{aps}}$$

which is the harmonic mean of the scores. There are other approaches for aggregating that can give similar results, such as using linear aggregation (e.g. f=a*np+b*lc+c*tc+d*aps+w) or multiplying scores together (e.g. f=np*lc*tc*aps+w).

The present disclosure, in various aspects, embodiments, and/or configurations, includes components, methods, processes, systems, and/or apparatus substantially as depicted and described herein, including various aspects, embodiments, configurations embodiments, sub-combinations, and/ or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for automated, real-time processing of log files, the method comprising:
   reading, by a processor of a log analysis system, a log file generated during execution of an application and comprising a plurality of log events;
   generating, by the processor of the log analysis system, a plurality of templates based on the plurality of log events in the log file, each template of the plurality of templates mapping a log event of the plurality of log events in the log file to a candidate value for the log event;
   aggregating, by the processor of the log analysis system, the plurality of log events into a plurality of groups of log events based on the candidate value mapped to each log event in a plurality of templates;
   ranking, by the processor of the log analysis system, the plurality of groups of log events;
   partitioning, by the processor of the log analysis system, the log file based on the ranking of the plurality of groups of log events; and
   providing, by the processor of the log analysis system, one or more groups of log events of the plurality of groups of log events to an analysis process based on the partitioning of the log file.

2. The method of claim 1, wherein aggregating the plurality of log events into the plurality of groups of log events comprises:
   identifying a length of each candidate value mapped to each log event in a plurality of templates;
   determining whether different lengths of candidate values have been identified; and
   in response to determining different lengths of candidate values have been identified, separating the log events into a plurality of lists based on an identified length of the candidate value mapped to the log event.

3. The method of claim 2, wherein aggregating the plurality of groups of log events further comprises:
   identifying, for each list of the plurality of lists, a common substring for the candidate values in each list; and
   aggregating one or more lists of the plurality of lists based on the identified common substring for each list.

4. The method of claim 2, wherein ranking the plurality of groups of log events comprises:
   computing one or more features for each list in the plurality of lists; and
   calculating a ranking score for each list in the plurality of lists based on the computed one or more features for each list.

5. The method of claim 4, wherein the one or more features comprise one or more of a number of log events in each list, a number of templates of the plurality of templates that include the candidate values mapped to the log events in each list, a log file coverage for the log events in each list, or an average list size for the plurality of lists.

6. The method of claim 1, wherein partitioning the log file comprises identifying a chain of related log events for each of the provided one or more groups of log events.

7. The method of claim 6, wherein providing the one or more groups of log events of the plurality of groups of log events to an analysis process comprises providing the identified chain of related log events for each of the provided one or more groups of log events.

8. A system comprising:
   a processor; and
   a memory coupled with and readable by the processor and storing therein a set of instructions which, when executed by the processor, causes the processor to:
   read, in real-time, a log file generated during execution of an application and comprising a plurality of log events;
   generate, in real-time, a plurality of templates based on the plurality of log events in the log file, each template of the plurality of templates mapping a log event of the plurality of log events in the log file to a candidate value for the log event;
   aggregate, in real-time, the plurality of log events into a plurality of groups of log events based on the candidate value mapped to each log event in a plurality of templates;
   rank, in real-time, the plurality of groups of log events;
   partition, in real-time, the log file based on the ranking of the plurality of groups of log events; and
   provide, in real-time, one or more groups of log events of the plurality of groups of log events to an analysis process based on the partitioning of the log file.

9. The system of claim 8, wherein aggregating the plurality of log events into the plurality of groups of log events comprises:
   identifying a length of each candidate value mapped to each log event in a plurality of templates;
   determining whether different lengths of candidate values have been identified; and
   in response to determining different lengths of candidate values have been identified, separating the log events into a plurality of lists based on an identified length of the candidate value mapped to the log event.

10. The system of claim 9, wherein aggregating the plurality of groups of log events further comprises:
   identifying, for each list of the plurality of lists, a common substring for the candidate values in each list; and
   aggregating one or more lists of the plurality of lists based on the identified common substring for each list.

11. The system of claim 9, wherein ranking the plurality of groups of log events comprises:
   computing one or more features for each list in the plurality of lists; and
   calculating a ranking score for each list in the plurality of lists based on the computed one or more features for each list.

12. The system of claim 11, wherein the one or more features comprise one or more of a number of log events in each list, a number of templates of the plurality of templates that include the candidate values mapped to the log events in each list, a log file coverage for the log events in each list, or an average list size for the plurality of lists.

13. The system of claim 8, wherein partitioning the log file comprises identifying a chain of related log events for each of the provided one or more groups of log events.

14. The system of claim 13, wherein providing the one or more groups of log events of the plurality of groups of log events to an analysis process comprises providing the identified chain of related log events for each of the provided one or more groups of log events.

15. A non-transitory, computer-readable medium comprising a set of instructions stored therein which, when executed by a processor, causes the processor to:
   read a log file generated during execution of an application and comprising a plurality of log events;
   generate a plurality of templates based on the plurality of log events in the log file, each template of the plurality of templates mapping a log event of the plurality of log events in the log file to a candidate value for the log event;
   aggregate the plurality of log events into a plurality of groups of log events based on the candidate value mapped to each log event in a plurality of templates;
   rank the plurality of groups of log events;
   partition the log file based on the ranking of the plurality of groups of log events; and
   provide one or more groups of log events of the plurality of groups of log events to an analysis process based on the partitioning of the log file.

16. The non-transitory, computer-readable medium of claim 15, wherein aggregating the plurality of log events into the plurality of groups of log events comprises:
   identifying a length of each candidate value mapped to each log event in a plurality of templates;
   determining whether different lengths of candidate values have been identified; and
   in response to determining different lengths of candidate values have been identified, separating the log events into a plurality of lists based on an identified length of the candidate value mapped to the log event.

17. The non-transitory, computer-readable medium of claim 16, wherein aggregating the plurality of groups of log events further comprises:
   identifying, for each list of the plurality of lists, a common substring for the candidate values in each list; and
   aggregating one or more lists of the plurality of lists based on the identified common substring for each list.

18. The non-transitory, computer-readable medium of claim 16, wherein ranking the plurality of groups of log events comprises:
   computing one or more features for each list in the plurality of lists; and
   calculating a ranking score for each list in the plurality of lists based on the computed one or more features for each list.

19. The non-transitory, computer-readable medium of claim 18, wherein the one or more features comprise one or more of a number of log events in each list, a number of templates of the plurality of templates that include the candidate values mapped to the log events in each list, a log file coverage for the log events in each list, or an average list size for the plurality of lists.

20. The non-transitory, computer-readable medium of claim 15, wherein partitioning the log file comprises identifying a chain of related log events for each of the provided one or more groups of log events and wherein providing the one or more groups of log events of the plurality of groups of log events to an analysis process comprises providing the identified chain of related log events for each of the provided one or more groups of log events.

\* \* \* \* \*